US010246236B2

(12) United States Patent
Menzel, Jr.

(10) Patent No.: US 10,246,236 B2
(45) Date of Patent: Apr. 2, 2019

(54) INSULATED CONTAINER

(71) Applicant: Menzel Diversified Enterprises, LLC, Mooresville, NC (US)

(72) Inventor: Robert William Menzel, Jr., Mooresville, NC (US)

(73) Assignee: MENZEL DIVERSIFIED ENTERPRISES, Mooresville, NC (US)

(*) Notice: Subject to any disclaimer, the term of this patent is extended or adjusted under 35 U.S.C. 154(b) by 0 days.

(21) Appl. No.: 15/959,801

(22) Filed: Apr. 23, 2018

(65) Prior Publication Data
US 2018/0244448 A1 Aug. 30, 2018

Related U.S. Application Data

(62) Division of application No. 15/436,417, filed on Feb. 17, 2017, now Pat. No. 10,112,756.
(Continued)

(51) Int. Cl.
*B65D 65/46* (2006.01)
*B32B 37/18* (2006.01)
(Continued)

(52) U.S. Cl.
CPC ............ *B65D 65/466* (2013.01); *B31B 50/00* (2017.08); *B31B 50/44* (2017.08); *B31B 50/54* (2017.08);
(Continued)

(58) Field of Classification Search
CPC .............. B65D 81/3858; B65D 65/466; B65D 81/3823; B65D 81/3897; B31B 1/90;
(Continued)

(56) References Cited

U.S. PATENT DOCUMENTS

| 5,441,170 | A | * | 8/1995 | Bane, III | ........... B65D 5/48024 |
| | | | | | 206/523 |
| 5,508,072 | A | * | 4/1996 | Andersen | .............. B01F 3/1214 |
| | | | | | 229/5.81 |
| 5,582,670 | A | * | 12/1996 | Andersen | .................. C08L 1/28 |
| | | | | | 156/242 |
| 5,660,903 | A | * | 8/1997 | Andersen | .............. B01F 3/1214 |
| | | | | | 428/152 |

(Continued)

FOREIGN PATENT DOCUMENTS

| GB | 958500 A1 | 5/1964 |
| WO | 2017027189 A1 | 2/2017 |

OTHER PUBLICATIONS

International Search Report and Written Opinion of corresponding International Application No. PCT/US2017/018461 dated Apr. 10, 2017; 10 pages.

*Primary Examiner* — Christopher Demeree
(74) *Attorney, Agent, or Firm* — Shumaker, Loop & Kendrick, LLP

(57) ABSTRACT

An insulated container may include a rigid container surrounding an insulation layer formed from a post-industrial, pre-consumer card waste. The insulation layer may be characterized by a lack of any wrapping material. The insulation layer may be manufactured using a variety of converting processes including, carding, airlay, and needle punch to form a non-woven material for providing consistent density throughout the insulation layer. The insulation layer may include a natural fiber lamination layer on an outer surface of the insulation layer. The insulation layer may be biodegradable in an anaerobic environment.

4 Claims, 16 Drawing Sheets

Related U.S. Application Data

(60) Provisional application No. 62/338,136, filed on May 18, 2016.

(51) Int. Cl.
*B65D 81/38* (2006.01)
*B31B 50/44* (2017.01)
*B31B 50/54* (2017.01)
*B31B 50/00* (2017.01)
*B31B 120/00* (2017.01)
*B31B 100/00* (2017.01)
*B31B 50/81* (2017.01)
*B31B 120/40* (2017.01)
*B31B 105/00* (2017.01)

(52) U.S. Cl.
CPC .......... *B32B 37/18* (2013.01); *B65D 81/3858* (2013.01); *B31B 50/81* (2017.08); *B31B 2100/00* (2017.08); *B31B 2105/00* (2017.08); *B31B 2120/00* (2017.08); *B31B 2120/40* (2017.08); *B31B 2120/407* (2017.08); *B32B 2317/10* (2013.01); *B32B 2439/00* (2013.01); *Y02W 90/13* (2015.05)

(58) Field of Classification Search
CPC .......... B31B 7/00; B32B 37/18; B32B 13/02; B32B 5/02; B32B 5/022; B32B 5/024
USPC ................ 229/103.11, 5.81, 930; 106/206.1; 428/339, 35.6, 34.5; 156/242; 220/592.25, 592.2, 592.26
See application file for complete search history.

(56) References Cited

U.S. PATENT DOCUMENTS

| | | | | |
|---|---|---|---|---|
| 5,720,913 | A * | 2/1998 | Andersen | B01F 3/1214 264/108 |
| 5,736,209 | A * | 4/1998 | Andersen | B05B 11/0037 428/36.4 |
| 6,083,586 | A * | 7/2000 | Andersen | B29C 43/22 106/206.1 |
| 6,325,281 | B1 | 12/2001 | Grogan | |
| 6,341,708 | B1 | 1/2002 | Palley et al. | |
| 6,575,328 | B1 * | 6/2003 | Foraker | E04F 21/00 220/23.91 |
| 6,878,199 | B2 * | 4/2005 | Bowden | B65D 65/466 106/162.5 |
| 7,500,593 | B2 | 3/2009 | Mayer | |
| 8,349,444 | B2 * | 1/2013 | Kipp | C04B 28/26 264/241 |
| 8,575,478 | B2 | 11/2013 | Hakuma et al. | |
| 8,763,811 | B2 * | 7/2014 | Lantz | B65D 25/16 206/584 |
| 8,763,886 | B2 * | 7/2014 | Hall | B65D 81/3818 220/592.25 |
| 9,611,067 | B2 | 4/2017 | Collison | |
| 9,751,683 | B1 | 9/2017 | Jobe | |
| 2011/0114513 | A1 * | 5/2011 | Miller | B65D 27/16 206/204 |
| 2012/0145568 | A1 | 6/2012 | Collison et al. | |
| 2014/0093697 | A1 * | 4/2014 | Perry | B32B 5/26 428/172 |
| 2014/0093698 | A1 * | 4/2014 | Perry | B32B 5/26 428/172 |
| 2016/0304267 | A1 | 10/2016 | Aksan et al. | |
| 2016/0325915 | A1 | 11/2016 | Aksan et al. | |
| 2017/0334622 | A1 | 11/2017 | Menzel, Jr. | |

* cited by examiner

INSULATED CONTAINER

CROSS REFERENCE TO RELATED APPLICATIONS

This application is a divisional application of U.S. patent application Ser. No. 15/436,417 filed on Feb. 17, 2017, which is a non-provisional application tracing priority to U.S. Provisional Application No. 62/338,136, filed on May 18, 2016. This application claims the full benefit and priority to the 62/338,136 application and the Ser. No. 15/436,417 application, both of which are herein expressly incorporated by reference in their entireties.

TECHNICAL FIELD AND BACKGROUND OF INVENTION

The present invention relates to the field of containers and to the field of insulated containers. More particularly, the present invention relates to the field of insulated shipping containers utilizing sustainable materials including recycled post-industrial, pre-consumer natural fiber. The containers according to the present invention may be used in transporting and storing objects which may be at a temperature that is different from the temperature outside the container.

Temperature sensitive products need to be transported from time to time. For instance, certain medications may need to be kept cool relative to temperatures outside of the container. In other instances, food may need to be kept warm relative to temperatures outside of the container. As a result of these needs, packaging has been designed to maintain an internal temperature according to the requirements of the product. Some packaging may utilize electro-mechanical devices such as refrigeration, heat exchangers, or heat sinks in order to provide a required steady temperature. Other packaging may utilize foams, plastics, and other polymers along with cool packs, water ice, or dry ice in order to maintain the required temperature environment inside the packaging.

However, many of these packages and devices are expensive and heavy (as with the refrigeration and heat sinks) or are harmful to the environment (as with some refrigeration and also the foams and plastics) or both. Because of these problems, some have devised products which may be made from post-consumer waste such as recycled cotton gathered from used clothing. However, these products may be prone to contamination from yarn dies, applied chemicals, and other contaminants which the clothing may have acquired during the period of use. The post-consumer material must be cleaned and shredded ahead of reprocessing, however, this process does not eliminate yarn dies and the possibility of contaminants. Most post-consumer waste retains a blue colorization after processing. Therefore, because of the contamination and residual colorization issues these products require that any insulation manufactured from post-consumer cotton be wrapped in another material such as plastic. This use of plastic and other barriers undermines the environmental incentive for using a recycled product by posing additional environmental concerns. It may also further add to the manufacturing costs.

Accordingly, there is a long felt need in the art for a packaging material which affords safe transportation of temperature sensitive materials, which has a consistent density, which maintains an in internal temperature relative an external temperature, which is efficiently and economically manufactured, which is lightweight, and which minimizes negative impacts to the environment.

SUMMARY OF THE INVENTION

The present invention is an insulated shipping container which affords safe transportation of temperature sensitive products, which has a consistent density, which maintains an in internal temperature relative to an external temperature, which is efficiently and economically manufactured, which is lightweight, and which minimizes negative impacts to the environment.

The present invention utilizes post-industrial, pre-consumer cotton waste. Post-industrial, pre-consumer cotton waste may include fiber material gleaned and/or trimmed as part of cotton manufacturing, and converting process.

Such fiber material, collected from the manufacturing process, may contain small pieces of cotton seed pods and stems removed as part of the manufacturing process. These fiber materials have not been converted into finished products (such as clothing or other fabrics). Thus, the present invention is directed to an insulated shipping container utilizing unwrapped cotton waste as the thermal insulating layer.

However, the invention is not limited only to waste generated from a single manufacturing or converting process. As such, post-industrial, pre-consumer waste may be from raw cotton processing, cotton yarn manufacturing, cotton fabric manufacturing and related processes such as carding, airlay, garneting, and other similar methods of manufacturing.

According to one aspect of the invention, the use of polyethylene film wrapped around pads manufactured from cotton waste can be eliminated. No wrapping is required by the present invention and exposed fibers alone can be utilized. Because the fibers are pre-consumer, according to the present invention, the risk of cross contamination from post-consumer recycled products is eliminated.

Alternatively, a natural fiber lamination may be applied to surfaces in order to provide a smoother surface wherein images and indicia may be applied. The elimination of poly wrap may provide an environmental benefit and also be a cost saving measure. The entirety of the insulation layer, whether including fibers alone or also including the laminated layer is biodegradable in anaerobic environments.

According to one embodiment of the invention, the insulating layer may have applied to it one or more natural fiber lamination layers. The natural fiber lamination layer may be applied to an outer surface of the insulating layer which may be a contact surface. In some embodiments, the natural fiber lamination layer may be applied to only one surface or may be applied to two surfaces but need not be applied to side edge surfaces.

According to one embodiment of the invention, an insulated container may include a rigid container surrounding an insulation layer formed from a post-industrial cotton waste. The insulation layer may be characterized by a lack of any wrapping material.

According to another embodiment of the invention, the rigid container may be made from cardboard.

According to another embodiment of the invention, the rigid container may be made from plastic. The plastic may be a reusable plastic.

According to another embodiment of the invention, the insulation layer may include a pair of interlocking C-shaped members forming an enclosed cube shaped cavity. The interior of the cube may form an interior portion of the insulated container.

According to another embodiment of the invention, the interlocking C-shaped members, referred to as an "A" and a "B" pad, may have a top portion which is integrally and hingedly formed in the member for providing access to an interior portion of the insulated container.

According to a method of practicing the invention, an insulated container may be manufactured by providing a rigid container and providing a quantity of post-industrial cotton waste. This post-industrial cotton waste may then be processed into a fiber sheet. The sheet made from the waste may be formed using a variety of converting processes including, carding, airlay, and needle punch to achieve a specified thickness and density. Next, the sheet may be cut into rectangular sections. A pair of sections may be arranged to form interlocking C-shaped members. The pair of sections, referred to as an "A" pad and a "B" pad, may then be placed into the rigid container.

According to another aspect of the method, the method may further include the step of laminating a natural fiber lamination layer to the fiber sheet.

According to another aspect of the method, the cotton waste includes cotton waste generated from one or more of cotton processing, cotton manufacturing, and/or cotton converting.

According to another aspect of the method, the insulation layer is capable of maintaining a constant internal temperature for 48 hours where three 500 ML and two 250 ML IV bags are cooled by four 24 oz frozen ice packs placed at the top and bottom below a payload.

According to another aspect of the method, the insulation layer is biodegradable in an anaerobic environment.

According to another aspect of the invention, both the rigid container and the pair of sections of the insulation layer may be provided to an end user in sheet form and may be assembled into the insulated container by the end user.

According to another embodiment of the invention, the insulated container may include an insulation layer formed from a post-industrial, pre-consumer cotton waste, a rigid cardboard container surrounding the insulation layer, and a natural fiber lamination layer applied to a contact surface of the insulation layer. According to such an embodiment, the cotton waste may include cotton waste generated from one or more of cotton processing, cotton manufacturing, and/or cotton converting. According to such an embodiment, the insulation layer may be biodegradable in an anaerobic environment. According to such an embodiment, the insulation layer may be capable of maintaining a constant internal temperature for 48 hours where three 500 ML and two 250 ML IV bags are cooled by four 24 oz frozen ice packs placed at the top and bottom below a payload.

According to one embodiment, the term biodegradable may mean that the insulation layer will biodegrade completely within one year or less when subjected to the biodegration dynamics contained in ASTM D5511. According to the ASTM D5511 protocol, test reaction mixture consisted of 10% shredded nitrile gloves, 10% Trypticase Soy Broth, 10% Thioglycollate medium, 60% municipal solid waste, and inoculated with concentrated inoculum (1.2×106 CFU/ml) of aerobic and anaerobic mixed culture in 0.01 M phosphate buffer at pH 7.2 placed in aerobic and anaerobic glass digesters, and incubated at 37.5°. Positive controls consisted of reaction mixture above with lab-grade cellulose (100%, Aldrich) instead of shredded test sample(s) while negative controls contained EDTA lab-grade (100%, Aldrich) instead of shredded test sample(s) in the test above. Reaction mixture was monitored at least daily, often more frequently, and sampled weekly for $CO_2$ production, trapped in 3 KOH bottles connected in series, over a period of 15 weeks when cumulative $CO_2$ production was observed. Biodegradation was deemed to be positive (passed P test, 95 or >95% biodegradation) or negative (failed test, 5 or <5% biodegradation), based on carbon conversion. Percentages (%), actual observed versus theoretical possible—based on total carbon content—were determined on a dry weight basis.

BRIEF DESCRIPTION OF THE FIGURES

Features, aspects and advantages of the present invention are understood when the following detailed description of the invention is read with reference to the accompanying drawings, in which.

DETAILED DESCRIPTION

Figure 1:
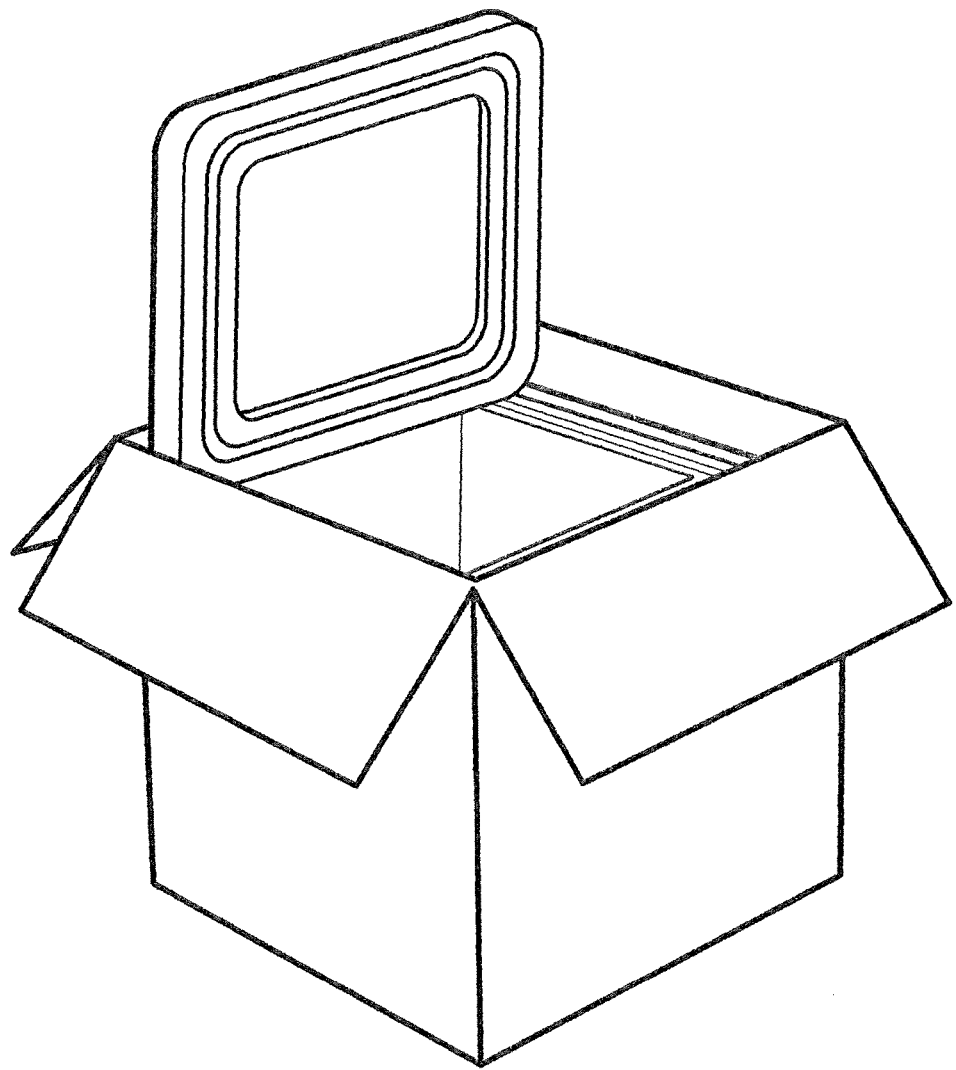
FIG. 1 is a perspective view of a prior art insulated container where the insulating material is expanded polystyrene foam.
Figure 2:
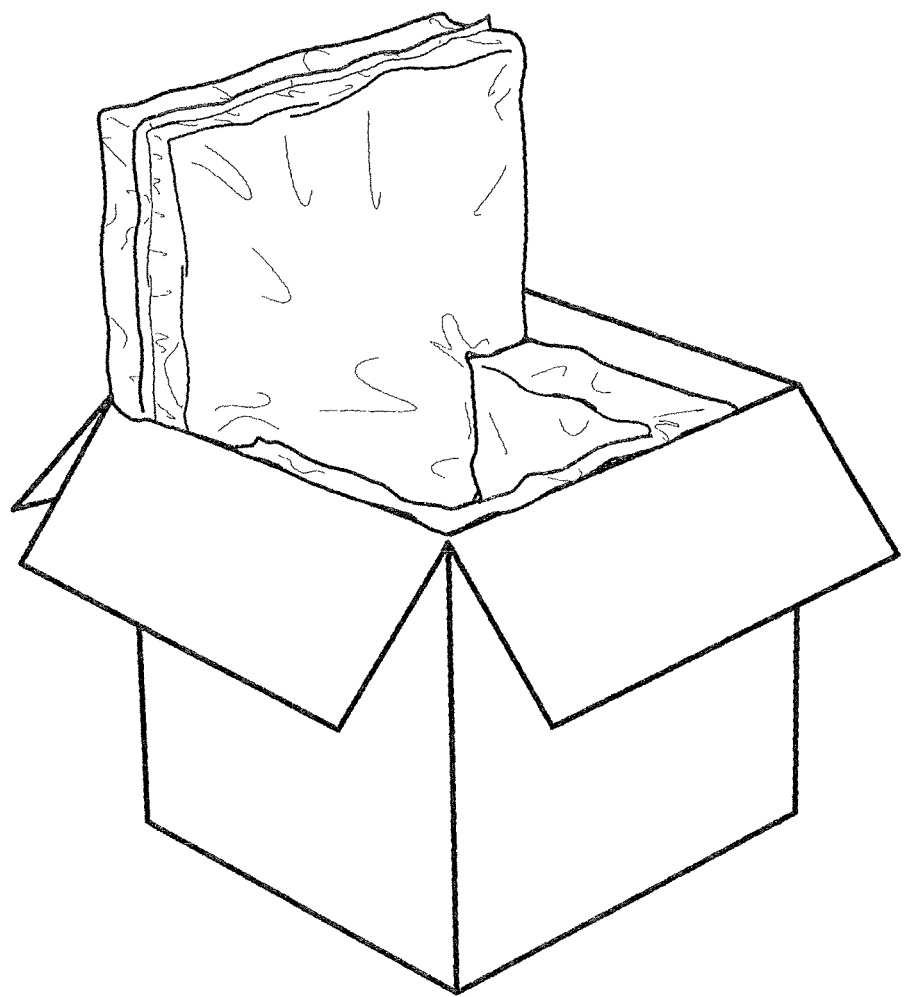
FIG. 2 is a perspective view of a prior art insulated container where the insulating material is enclosed in plastic.

FIG. 1 and FIG. 2 show prior art insulated containers. In particular, FIG. 1 shows a prior art insulated container having a rigid foam insulation layer. FIG. 2 shows a prior art insulated container having an insulation layer which is wrapped in plastic.

Figure 13:
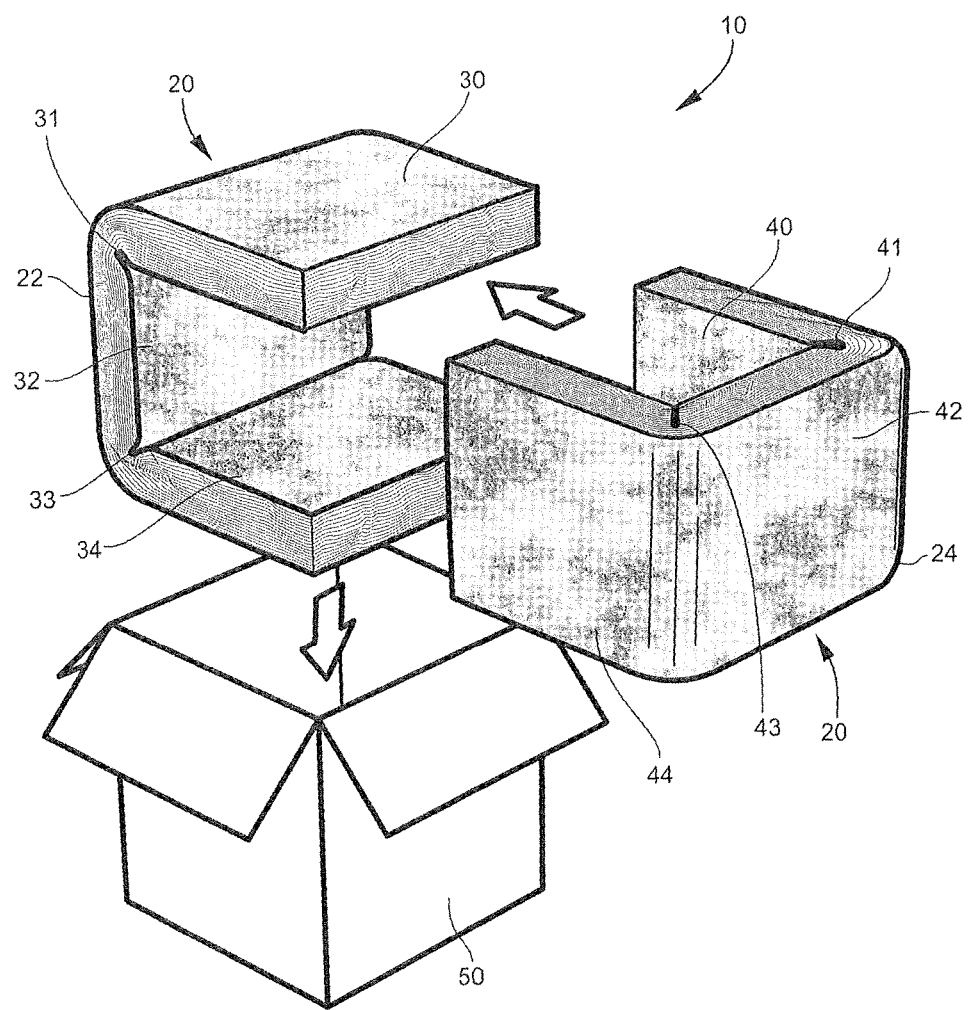
FIG. 13 is an exploded view of the insulated container in a partially assembled state and where the insulation layer does not include the natural fiber lamination.

Generally, FIGS. 3 through 10, show embodiments of the invention with insulation layer 20 having a natural fiber lamination layer 26 applied to contact surfaces. The contact surfaces are surfaces which may come into contact with contents of the container. Generally, FIG. 13 shows an alternate embodiment of the invention where there is no natural fiber lamination layer and the fibers of the insulation layer 20 are exposed to the contents of the container. The embodiment utilizing the natural lamination layer 26 may be preferred to the embodiment of FIG. 13 when a shipper desires that the contents not come into contact with the insulation layer, such as when shipping raw, unwrapped produce. The natural fiber lamination layer 26 is sustainable and is biodegradable. The natural fiber lamination layer 26 thus provides a helpful option to companies seeking a smoother, more consistent surface. The natural fiber lamination layer 26 may be made from a coffee filter paper, kraft paper, and the like. Text and images (not shown) may be printed on the lamination layer 26.

Figure 3:
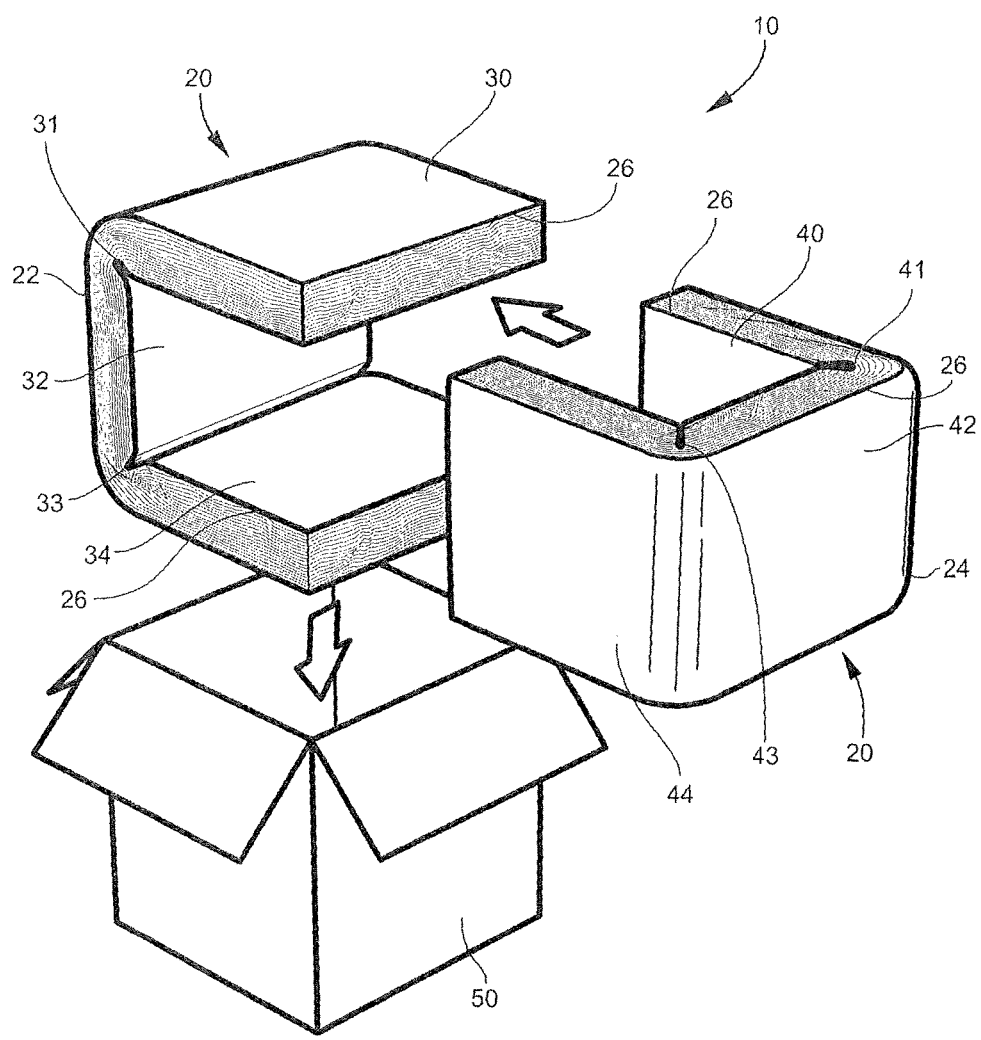
FIG. 3 is an exploded view of the insulated container in a partially assembled state.

Referring to FIG. 3, an insulated container 10 is shown in a partially assembled state. The insulated container 10 includes rigid container 50 and insulation layer 20. The rigid container 50 may be a cardboard box as shown. The insulation layer 20 is made from cotton waste. The cotton waste is processed into a sheet formed using a variety of converting processes including, carding, airlay, and needle punch to form a non-woven sheet. The insulation layer 20 is formed to maintain uniform density and of a thickness optimized for particular applications.

The sheet may then be cut into rectangles which may be bent into a pair of C-shaped members, 22, 24. The first C-shaped member, referred to as an "A" pad 22 forms lid portion 30 which is connected to back side portion 32 via first hinge portion 31. Bottom portion 34 is connected to back portion 32 via second hinge portion 33.

Similarly, the second C-shaped member, referred to as a "B" pad 24 forms first side portion 40 which is connected to front side portion 24 via hinge 41. Second side portion 44 is connected to front side portion 24 via hinge portion 43.

Figure 4:
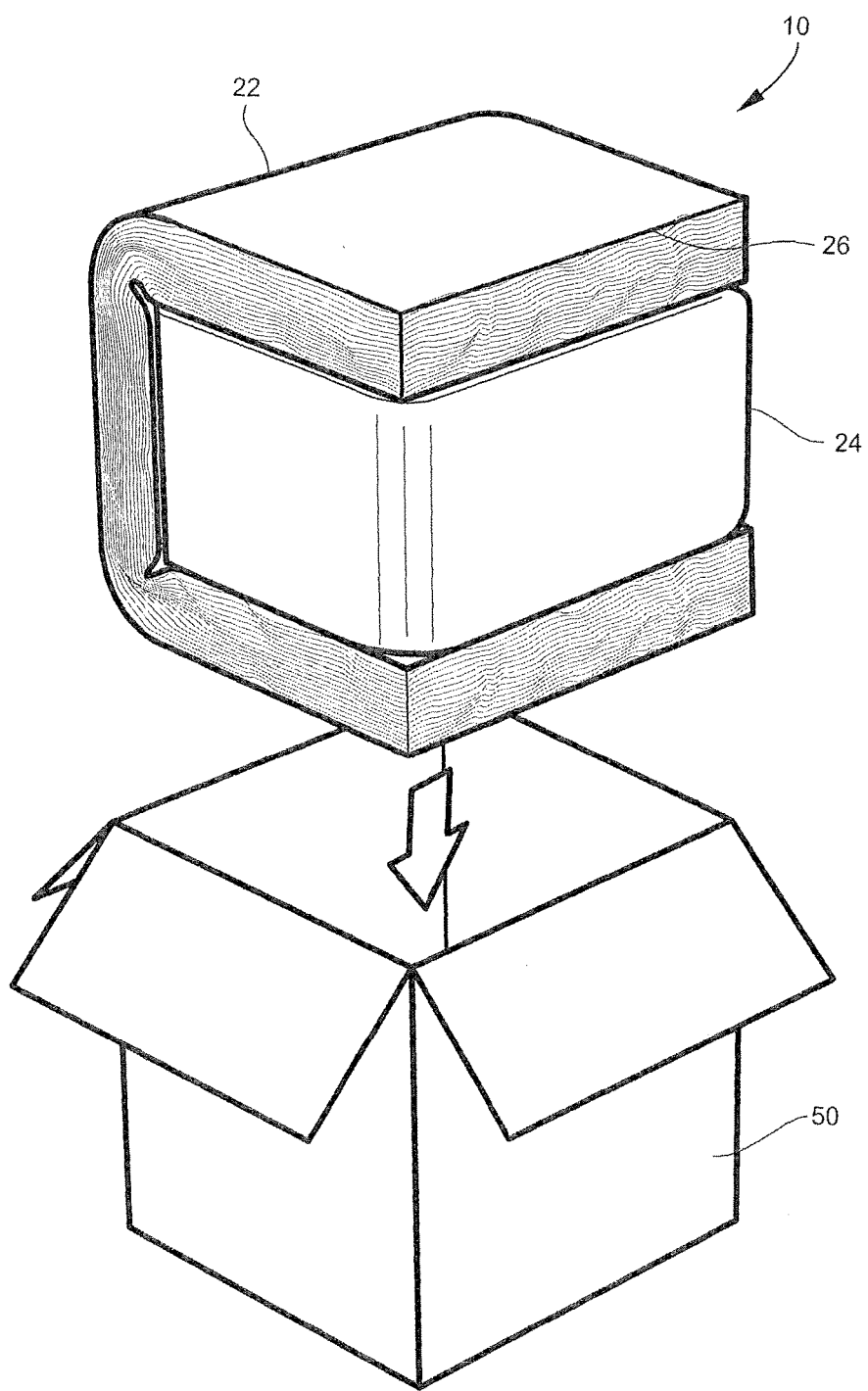
FIG. 4 is an exploded view of the insulated container in a partially assembled state.
Figure 5:
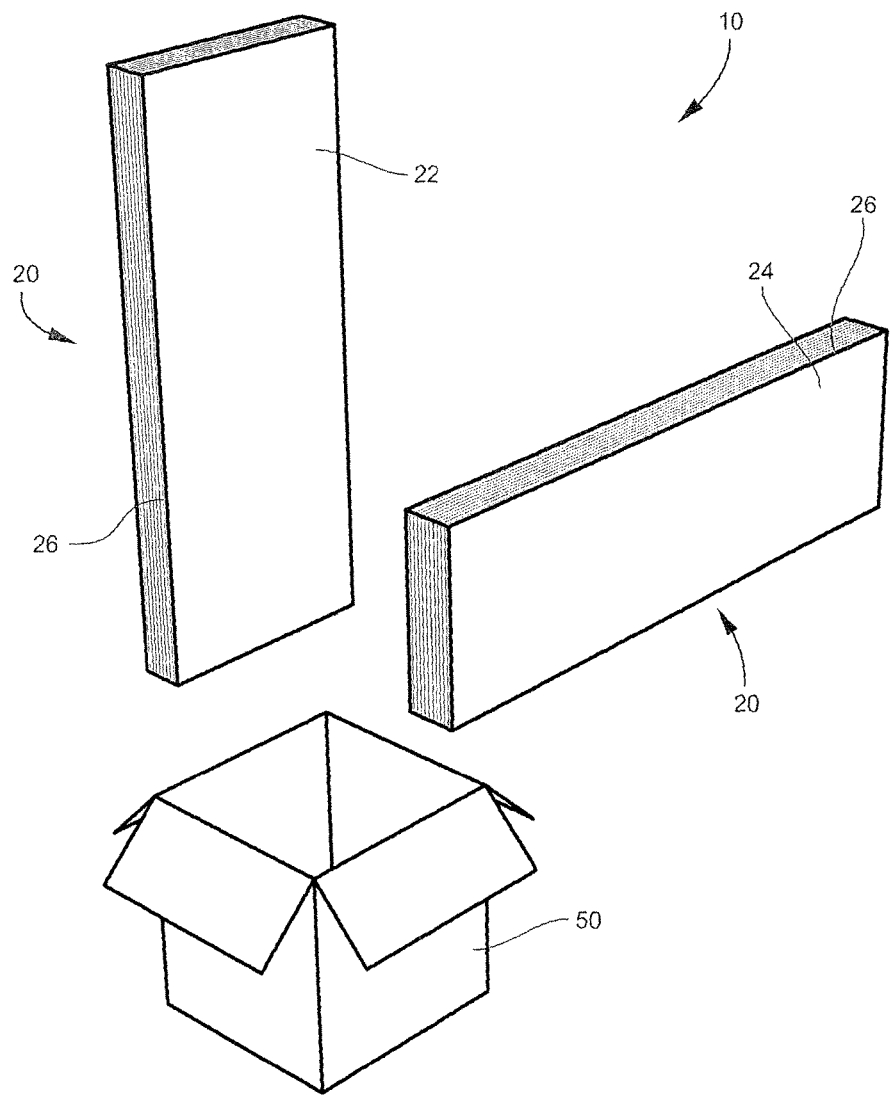
FIG. 5 is an exploded view of the insulated container in an unassembled state.
Figure 6:
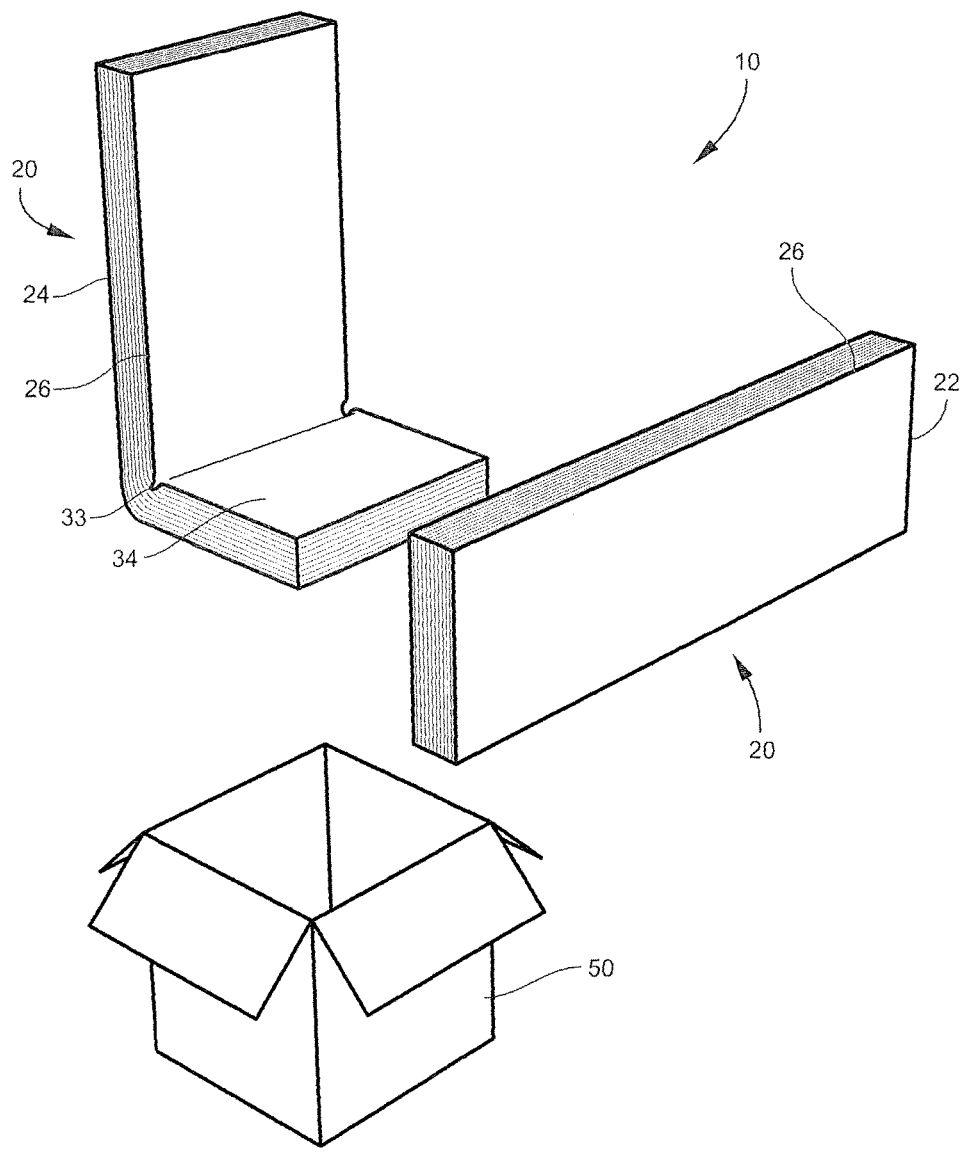
FIG. 6 is an exploded view of the insulated container in a partially assembled state.
Figure 7:
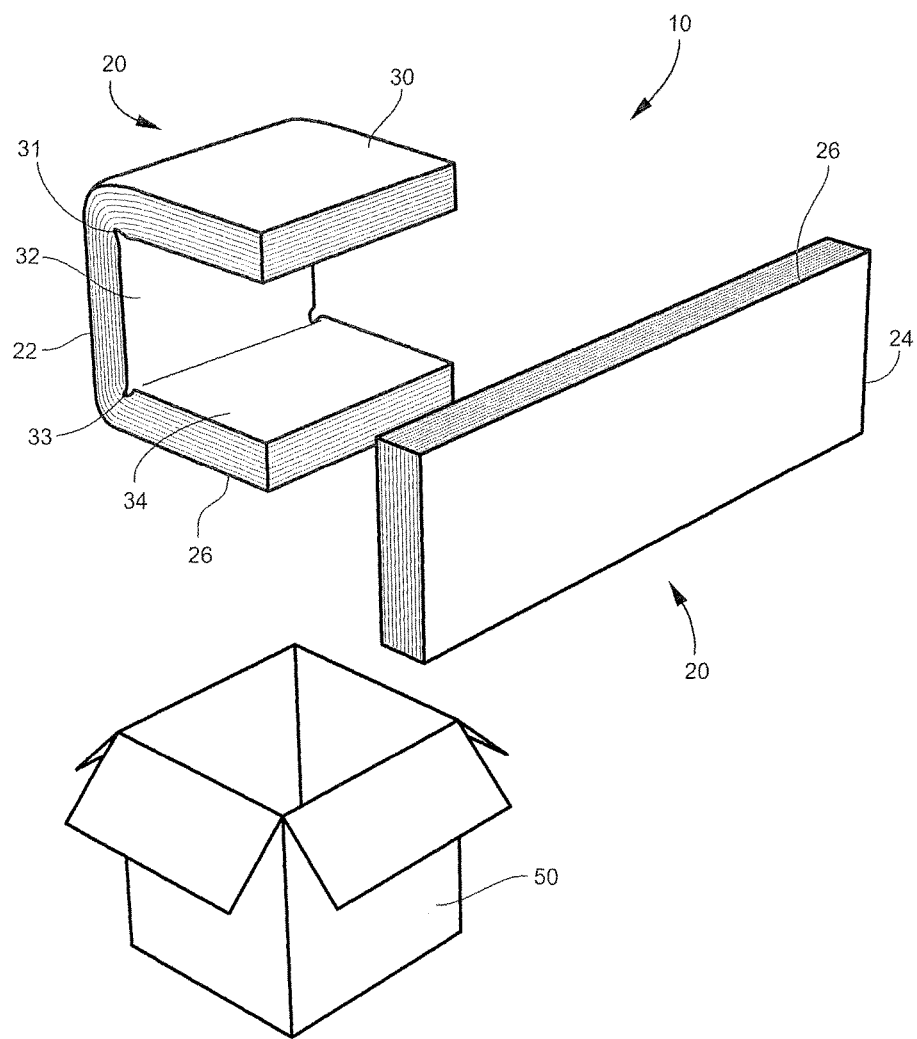
FIG. 7 is an exploded view of the insulated container in a partially assembled state.
Figure 8:
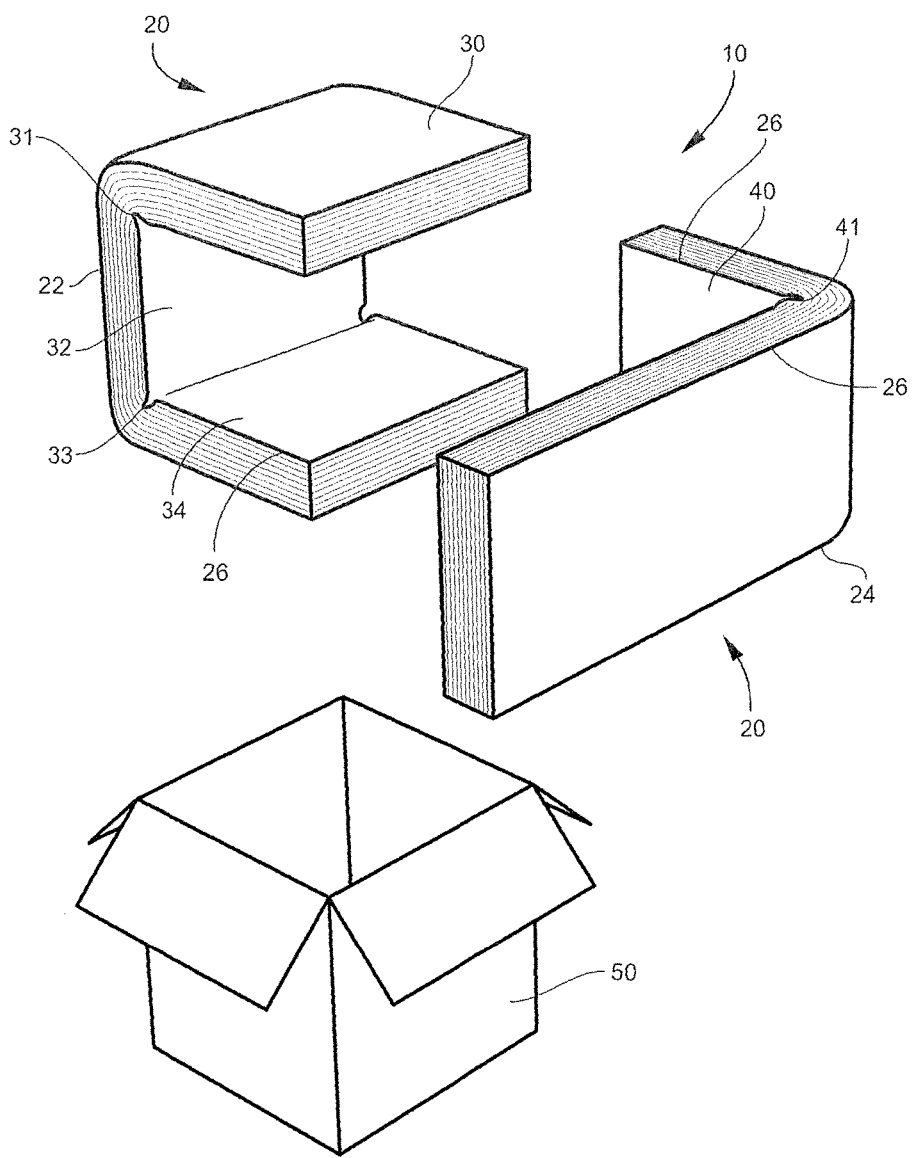
FIG. 8 is an exploded view of the insulated container in a partially assembled state.
Figure 9:
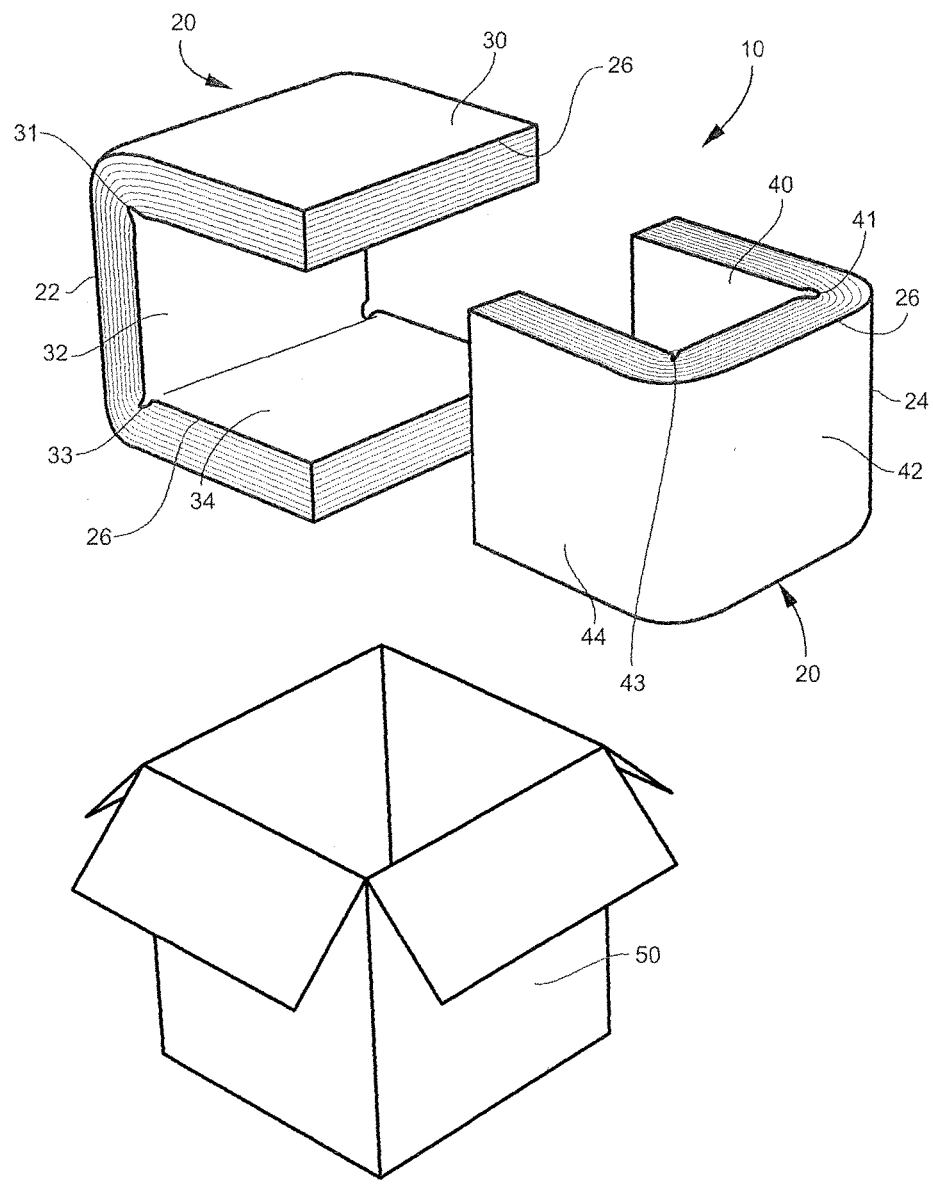
FIG. 9 is an exploded view of the insulated container in a partially assembled state.
Figure 10:
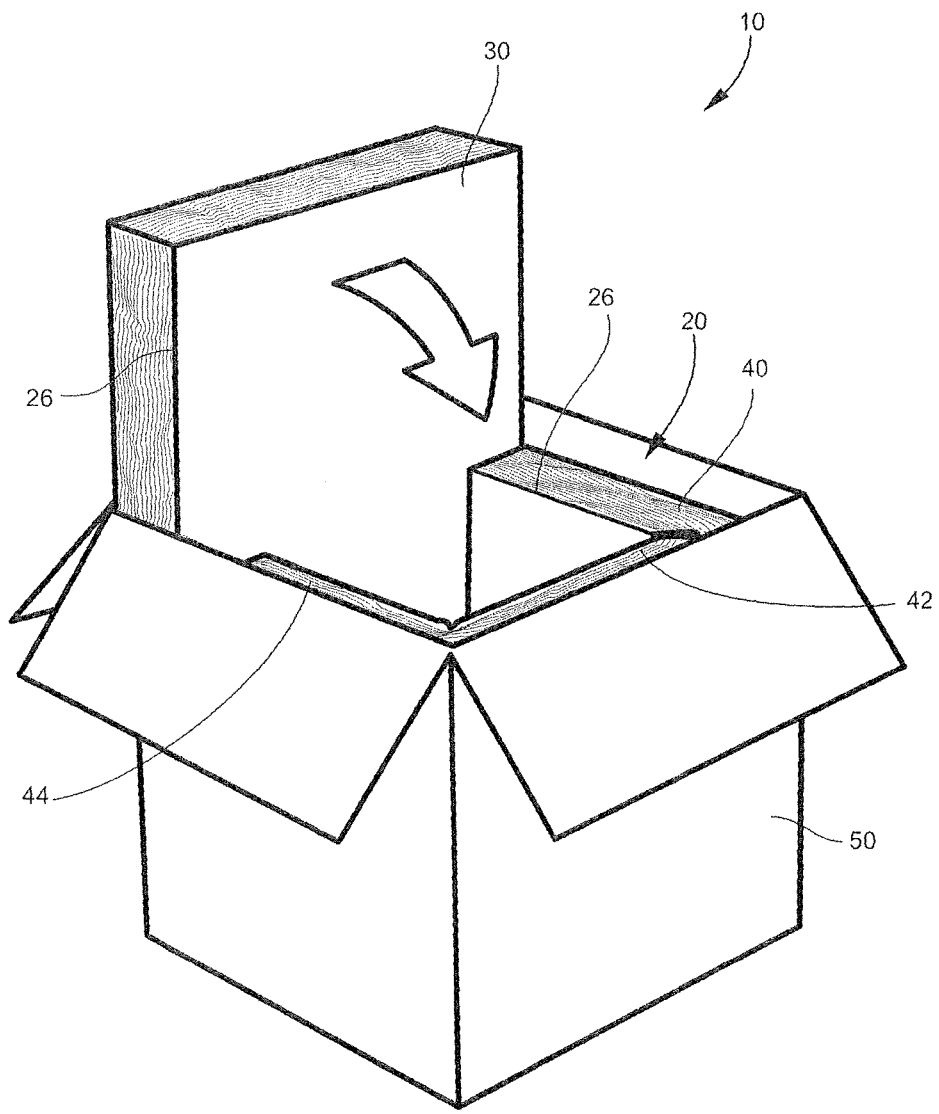
FIG. 10 is an exploded view of the insulated container in a partially assembled state.

When assembled, as shown in FIG. 4, second C-shaped member 24 fits into a cavity formed by first C-shaped member 22 to form the interlocking C-shapes of the insulation layer 20. As shown in FIGS. 5-10, the insulation layer 20 of the insulated container 10 may be assembled by folding respective C-shaped members 22, 24. As shown in FIG. 5, the C-shaped members 22, 24 may have in unfolded state that is a flat rectangular shape. As shown in FIGS. 6-9, hinges 31, 33 and 41, 43 may be formed by folding. These folds separate the portions 30, 32, 34, 40, 42, 44 of each C-shaped member 22, 24.

Figure 11:
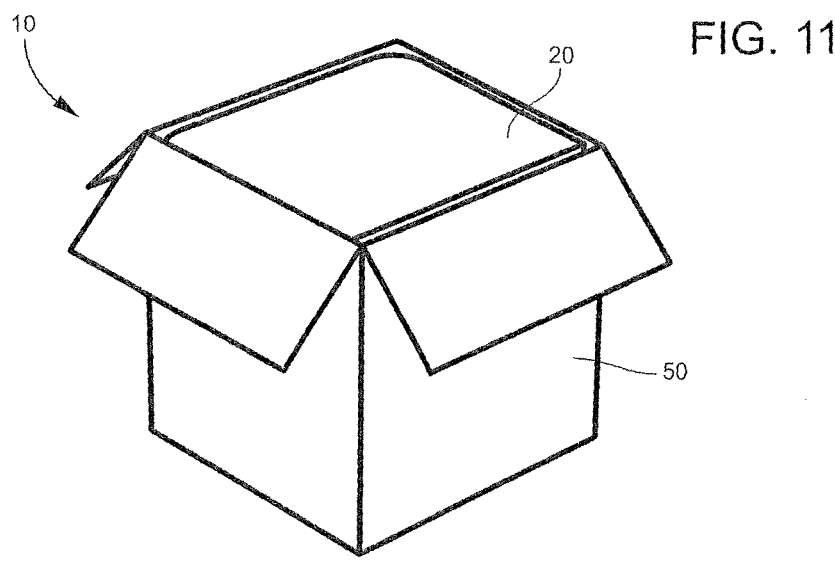
FIG. 11 is a perspective view of the insulated container in an assembled state.
Figure 12:
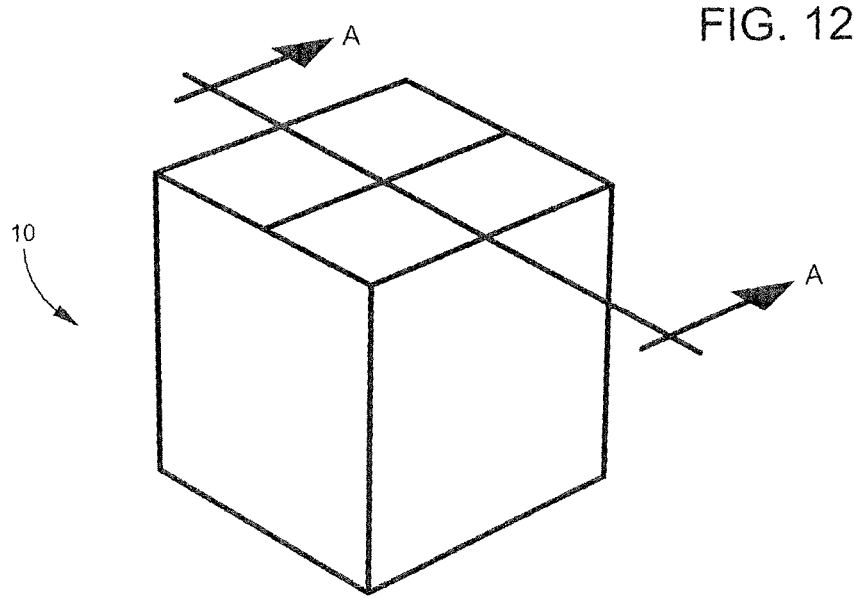
FIG. 12 is a perspective view of the insulated container in an assembled state.
Figure 12A:
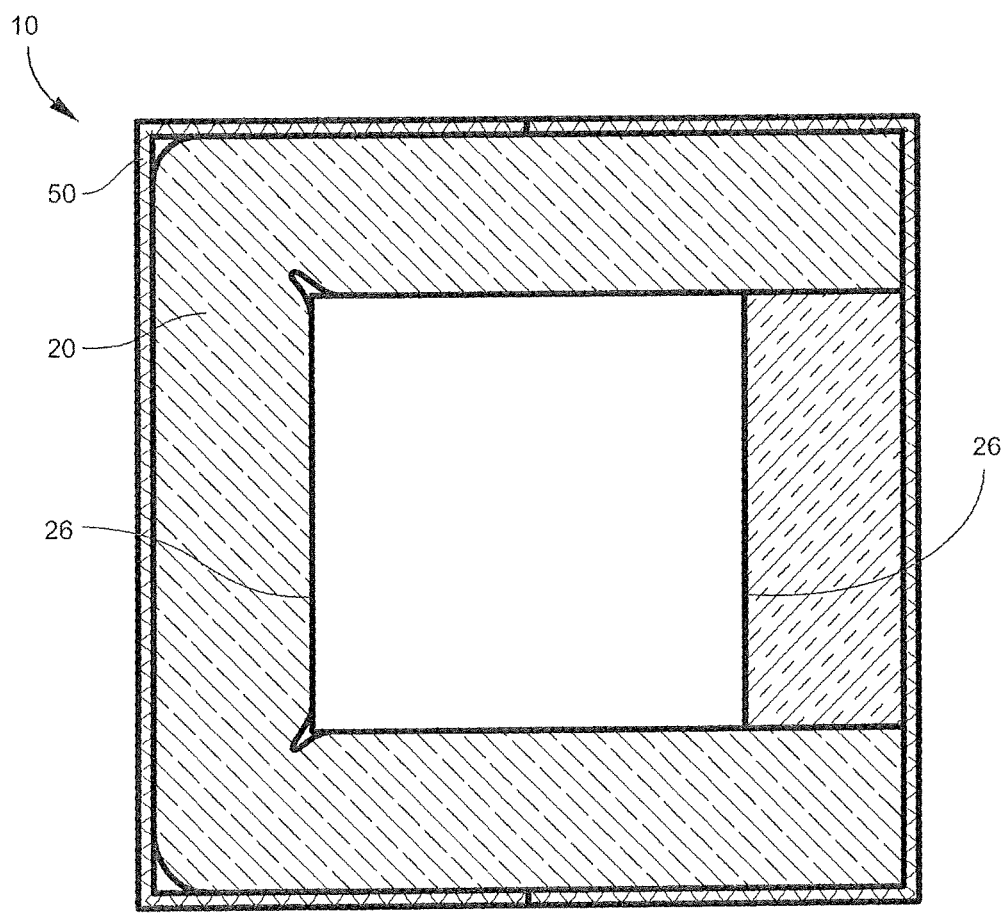
FIG. 12A is a sectional view of the insulated container.

FIG. 11 shows the fully assembled insulated container 10 with the lid of the rigid container 50 open. FIG. 12 visualized the cross-section A-A which is shown in FIG. 12A. In particular, the cross section A-A shows the insulation layer 20 inside the rigid container 50. The natural fiber lamentation layer 26 is shown on the contact surfaces. Importantly, there is no plastic or non-biodegradable layer between the insulation layer 20 and the rigid container 50 as is present in the prior art of FIG. 2. That is, there is no additional plastic housing surrounding the insulation layer 20. Both to the rigid container 50 and the internal cavity of the insulate container.

FIG. 13 shows the insulated container 10 of FIGS. 3-12A but where the natural fiber insulation layer has not been added during the manufacturing process. Accordingly, the cotton waste of the insulation layer 20 is exposed.

Figure 14:
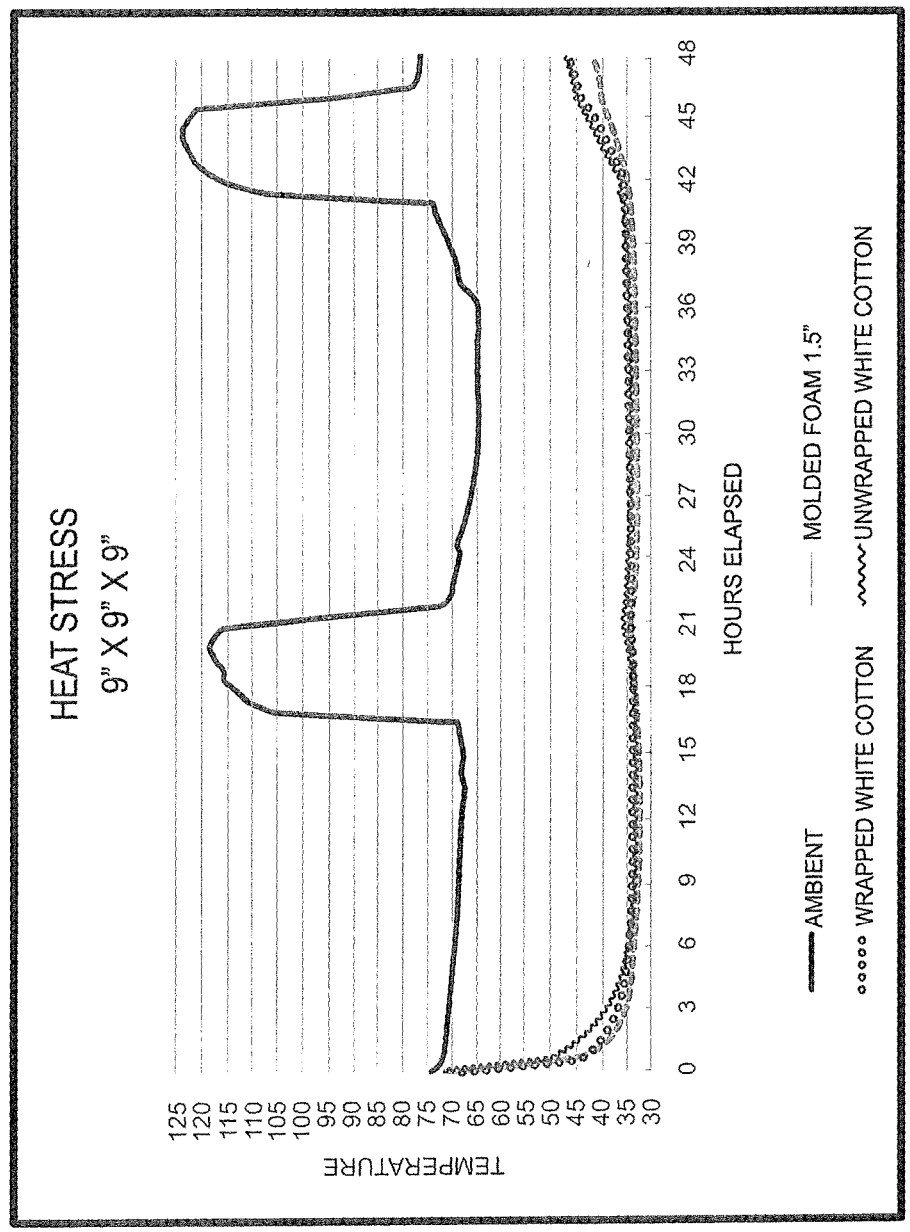
FIG. 14 is a heat stress chart.

An embodiment of the invention may be created wherein the container is capable of maintaining a constant internal temperature for 48 hours where three 500 ML and two 250 ML IV bags are cooled by four 24 oz frozen ice packs. The ice packs are placed at the top and bottom below the payload. FIG. 14 shows heat stress test results which were recorded by individual data loggers within and outside the test package as well as in proximity to the IV bags. The top line shows the ambient temperature outside the insulated container. The other lines show "wrapped white cotton" "molded 1.5 inch foam" and "unwrapped white cotton."

Figure 15:
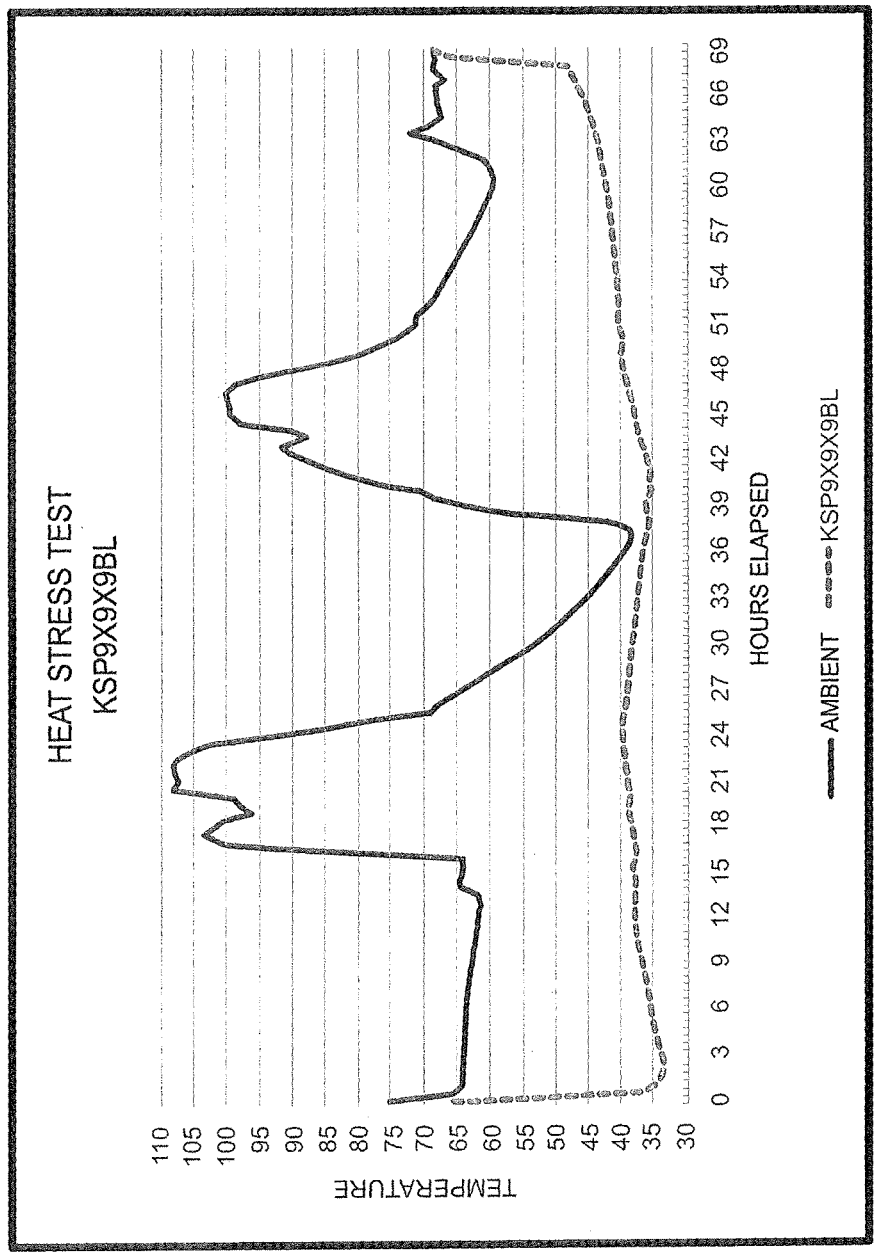
FIG. 15 is a heat stress chart.

Another embodiment of the invention may be created wherein the container is capable of maintaining a constant internal temperature for 48 hours where six 600 ML IV bags are cooled by four 24 oz frozen ice packs. The ice packs are placed at the top and bottom below the payload. FIG. 15 shows heat stress test results which were recorded by individual data loggers within and outside the test package as well as in proximity to the IV gabs. The top line shows the ambient temperature outside the insulated container. The lower line shows the internal temperature.

Figure 16:
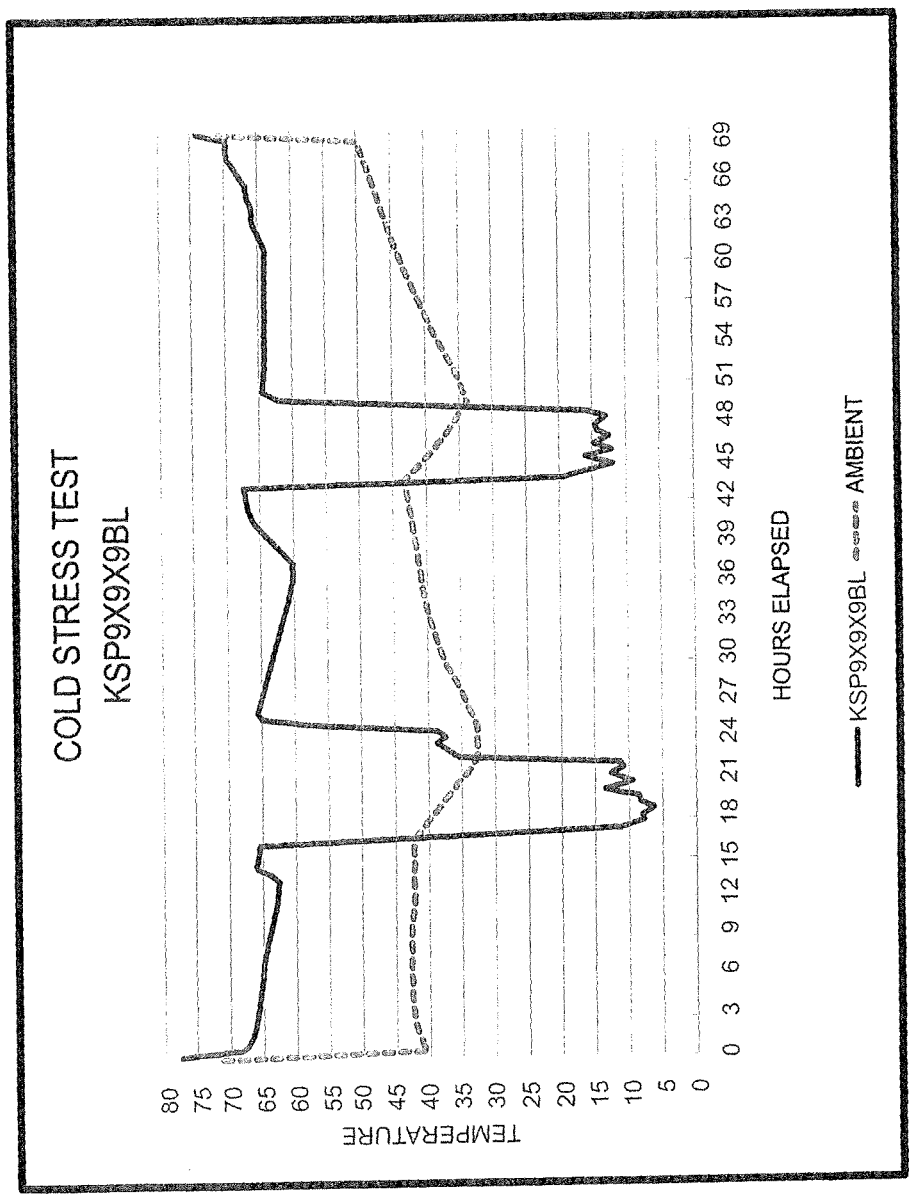
FIG. 16 is a cold stress chart.

Another embodiment of the invention may be created wherein the container is capable of maintaining a constant internal temperature for 48 hours where six 600 ML IV bags are cooled by two 24 oz frozen ice packs and two 24 oz ambient ice packs. The ice packs are placed at the top and bottom below the payload. FIG. 16 shows cold stress test results which were recorded by individual data loggers within and outside the test package as well as in proximity to the IV gabs. The top line shows the ambient temperature outside the insulated container. The lower line shows the internal temperature.

Another embodiment may be created where the insulated container 10 complies with test scope protocol ISTA 7D such that it maintains temperature above 2° C. and below 8° C., without freezing, in simulated summer/heat stress conditions for a 48 hour distribution cycle. According to the ISTA 7D test, six 24 oz gel ice packs were added to the insulated container 10 with a payload of six 500 mL IV bags (Lactated Ringer's Solution USP), conditioned to 3° C.

Another embodiment may be created where the insulated container 10 complies with test scope protocol ISTA 7D such that it maintains temperature above 2° C. and below 8° C., without freezing, in simulated winter/cold stress conditions for a 48 hour distribution cycle. According to the ISTA 7D test, four 24 oz gel ice packs were added to the insulated container 10 with a payload of ten 500 mL IV bags (Lactated Ringer's Solution USP), condition to 3° C.

An insulated container 10 according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. A method of making an insulated container comprising the steps of:
   providing a rigid container;
   providing a quantity of post-industrial, pre-consumer cotton waste;
   processing the post-industrial cotton waste into a sheet;
   converting the waste via one or more converting processes including: carding, airlay, and needle punch to achieve a specified thickness and density;
   laminating a natural fiber lamination layer, comprising only a single layer, to the sheet cutting the sheet into rectangular sections;

forming the rectangular sections into interlocking C-shaped members; and placing the interlocking C-shaped into the rigid container.

2. The method of claim 1 wherein the cotton waste includes cotton waste generated from one or more of cotton processing, cotton manufacturing, and/or cotton converting.

3. The method of claim 1 wherein the insulation layer is capable of maintaining a constant internal temperature for 48 hours where three 500 ML and two 250 ML IV bags are cooled by four 24 oz frozen ice packs placed at the top and bottom below a payload.

4. The method of claim 1 wherein the insulation layer is biodegradable in an anaerobic environment.

\* \* \* \* \*